(12) United States Patent
Namburi

(10) Patent No.: US 9,471,660 B2
(45) Date of Patent: Oct. 18, 2016

(54) PARTITION LOOKUP AND STATE SYNCHRONIZATION

(71) Applicant: Mallikarjuna Namburi, San Francisco, CA (US)

(72) Inventor: Mallikarjuna Namburi, San Francisco, CA (US)

(73) Assignee: SYBASE, INC., Dublin, CA (US)

( * ) Notice: Subject to any disclaimer, the term of this patent is extended or adjusted under 35 U.S.C. 154(b) by 275 days.

(21) Appl. No.: 14/208,913

(22) Filed: Mar. 13, 2014

(65) Prior Publication Data

US 2015/0261839 A1    Sep. 17, 2015

(51) Int. Cl.
G06F 17/30 (2006.01)

(52) U.S. Cl.
CPC .............................. *G06F 17/30584* (2013.01)

(58) Field of Classification Search
CPC .................. G06F 17/30584; G06F 17/30368; G06F 17/30575; G06F 12/126
USPC ................ 1/1; 707/610, 703, 704, 715, 830; 711/159
See application file for complete search history.

(56) References Cited

U.S. PATENT DOCUMENTS

| | | | | |
|---|---|---|---|---|
| 7,814,117 B2 * | 10/2010 | Baby | ................ | G06F 17/30911 707/769 |
| 8,380,702 B2 * | 2/2013 | Baby | ................ | G06F 17/30911 707/715 |
| 8,615,503 B2 * | 12/2013 | Adyilamuriyil | .. | G06F 17/30584 707/703 |
| 8,930,312 B1 * | 1/2015 | Rath | ................ | G06F 17/30575 707/634 |
| 2007/0226739 A1 * | 9/2007 | Dodge | ................ | G06F 9/4881 718/102 |
| 2008/0249990 A1 * | 10/2008 | Baby | ................ | G06F 17/30911 |
| 2010/0235348 A1 * | 9/2010 | Baby | ................ | G06F 17/30911 707/715 |
| 2013/0346707 A1 * | 12/2013 | Voznika | ................ | G06F 12/126 711/159 |

* cited by examiner

*Primary Examiner* — Dennis Troung
(74) *Attorney, Agent, or Firm* — Sterne, Kessler, Goldstein & Fox P.L.L.C.

(57) ABSTRACT

Disclosed herein are system, method, and computer program product embodiments for multilevel synchronization of database table partition states. An embodiment operates by retrieving a partition from a partition lookup structure and determining whether the partition is in an active state. Based on a determination that the partition is in the active state an embodiment increments a counter associated with the partition using a compare-and-swap instruction accesses the partition.

20 Claims, 5 Drawing Sheets

PARTITION LOOKUP AND STATE SYNCHRONIZATION

BACKGROUND

Many database systems rely on partitioning to improve performance. Generally, databases consist of one or more tables of data. Partitioning a table into distinct parts can improve the performance and availability of the data. Accessing data in a partitioned database table involves finding the partition by, for example, looking up an identifier in a list of partitions. Changing the state of a partition may require synchronization among multiple processes that access the partition. Current methods of synchronizing partition states may require using a synchronization variable, such as a mutex. However, a synchronization variable may cause performance degradation in processes waiting to obtain access to the variable.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for multilevel synchronization of database table partition states.

Figure 1:
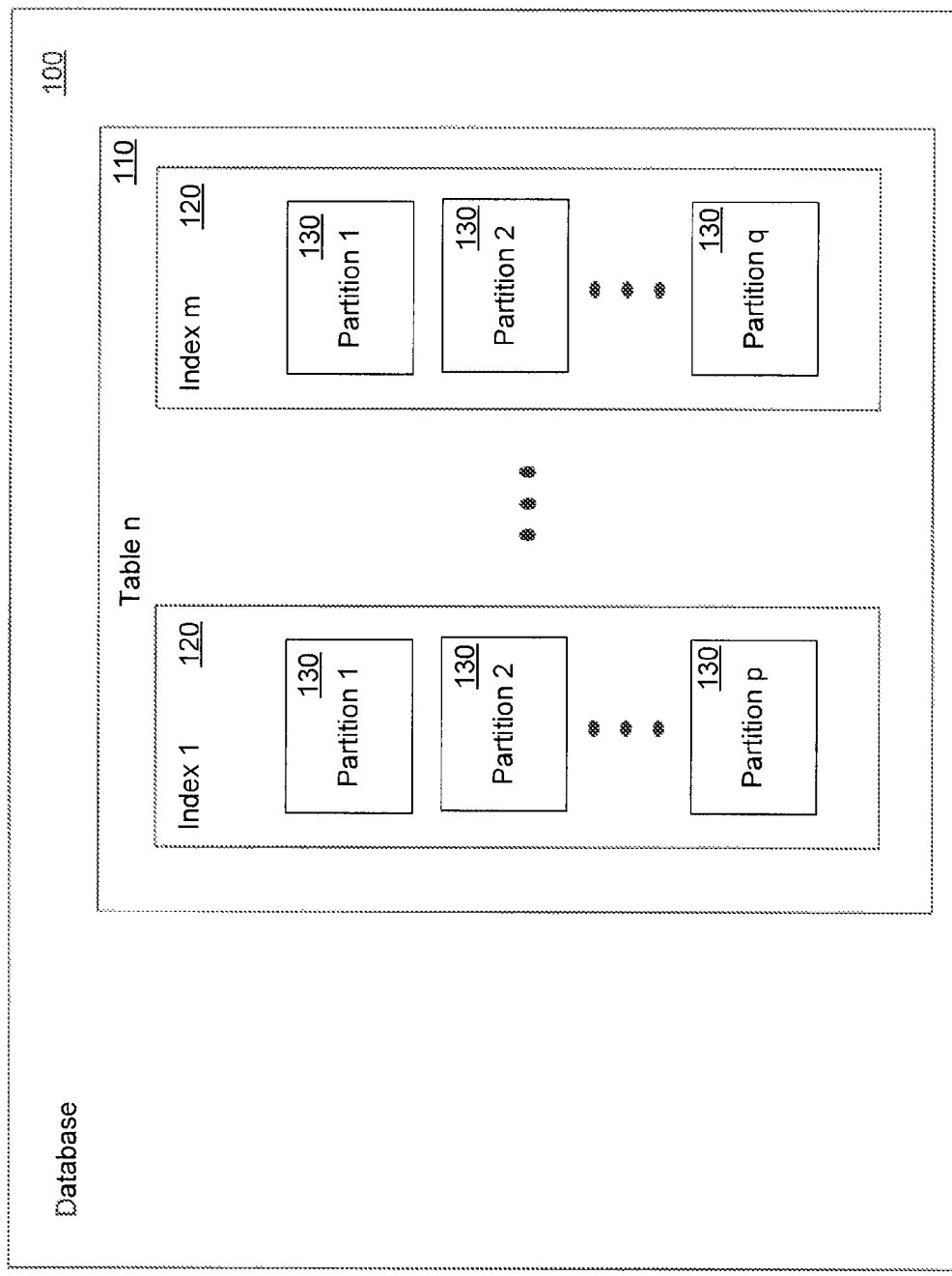
FIG. 1 is a block diagram of a database where multilevel synchronization of partition states can be performed, according to an example embodiment.

FIG. 1 is a block diagram of a database 100 where multilevel synchronization of partition states can be performed, according to an example embodiment.

Database 100 includes one or more tables 110 containing one or more indices 120. Database 100 may be implemented in any computer system, as described below with reference to FIG. 5 by way of example. A table 110 comprises an organized set of data elements stored in database 100. A table 110 can be modeled as a set of vertical columns, identified by name, and horizontal rows. For example, a table 110 may be created to store data regarding employees of a company. The table 110 may include columns for each type of information to be stored about each employee, for example, employee name, social security number, phone number, office location, etc. Each row of the table could then represent the value of the information for one employee.

An index 120 is a data structure for improving the speed of data retrieval in a table 110. An index 120 can be created and maintained to quickly locate data without having to traverse an entire table 110. For example, an index 120 can include an organized listing of employees sorted by social security number and pointing to the corresponding row in table 110. In this way, the database can quickly locate an employee record using the social security number.

An index 110 can be divided into one or more partitions 130. A partition 130 can create a division of a table 110 into independent parts. The partitioning can be done based on identified criteria. Common criteria for partitioning a table include range partitioning and list partitioning. Range partitioning can create a partition by selecting values within a particular range. For example, a partition could be for all table rows where the column for zip code has a value between 20000 and 29999. List partitioning can be a list of values that a column satisfies. For example, all rows where the column for office location is either Boston, New York, Philadelphia, or Washington, D.C., could make a partition for East Coast offices.

When a table 110 is partitioned, satisfying a database query may require locating the partition where the queried data is located. Traditionally, a database table may maintain a list of partitions. Conventionally, a partition may be identified using an index identifier and a partition identifier together. With traditional solutions, a database task trying to satisfy a query can access the list of partitions to locate a desired partition.

Partitions 130 can have an associated state. For example, when a partition 130 is first created it can be set to a CREATE state until the creation process completes. When the partition 130 is ready for use, it can be set to an ACTIVE state. Furthermore, when a partition 130 is ready to be dropped (i.e., removed) the partition 130 can be set to a DROP state until the dropping process completes.

The table 110 can include a data structure, which is described in greater detail below in conjunction with FIGS. 2 and 3, for efficient partition lookup. The data structure can be associated to partitions that could change in state independently, and can handle counters for the partitions to efficiently synchronize multiple access to the partitions.

Figure 2:
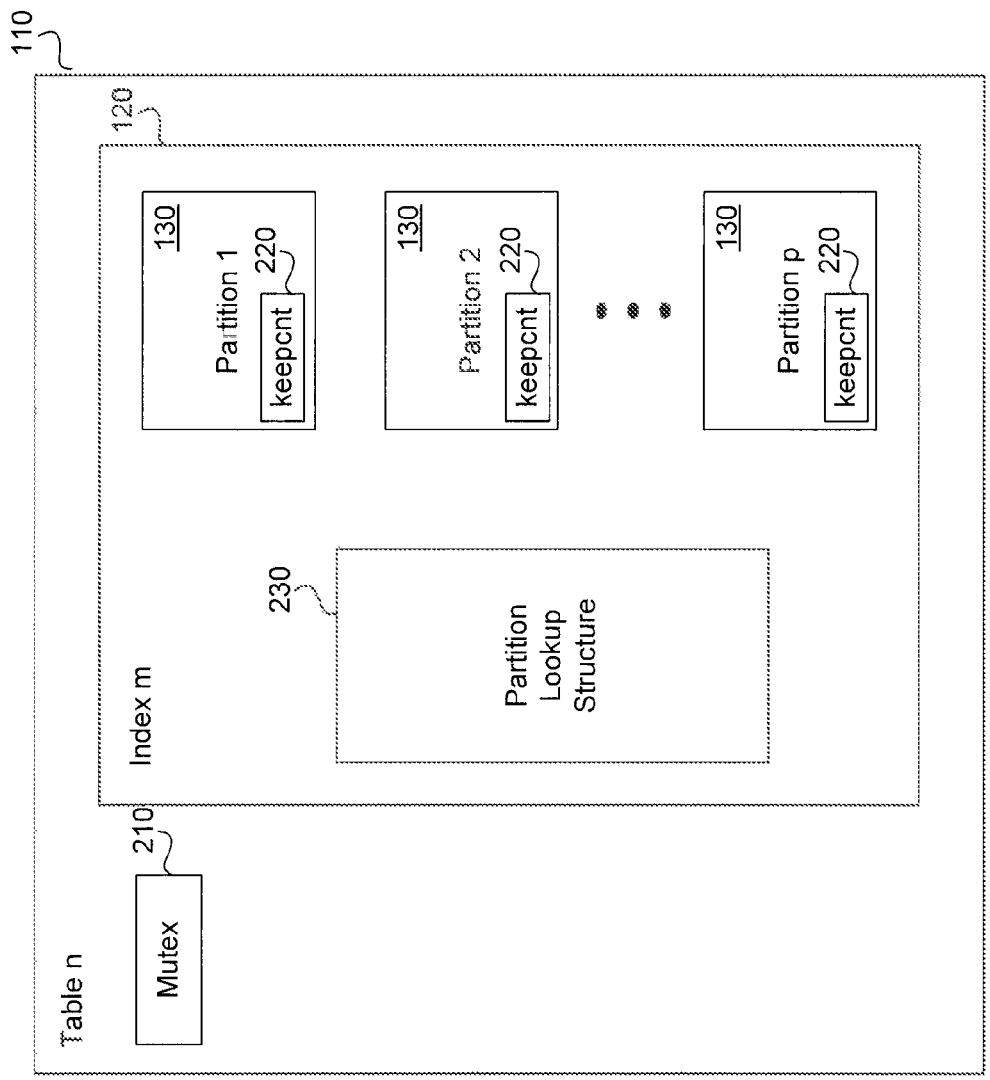
FIG. 2 is a block diagram showing further details of a partitioned database table configured to perform multilevel synchronization of partition states, according to an example embodiment.

FIG. 2 is a block diagram showing further details of a database table 110 with partitions 130 configured to perform multilevel synchronization of partition states, according to an example embodiment.

Table 110 can contain a mutex 210 and partitions 130. Mutex 210 is a variable used for concurrency control. In general, a mutex is used to prevent two concurrent processes from accessing a shared resource simultaneously. In an embodiment, mutex 210 is used to control access to indices in table 110. For example, a process wanting change the state of a partition can set mutex 210, perform the modification, and then clear mutex 210. In this manner, the mutex 210 serves to prevent access to one or more partitions, whose state is being changed by an initial process, by other processes while the partitions are being placed in a transitory state by the initial process.

Partitions 130 can also contain a variable (e.g., keepcnt variable 220) that maintains a count of how many processes are currently accessing the corresponding partition. When a process accesses a partition it increments the partition's keepcnt 220. If a process wanted to drop (i.e., remove) a partition, the process would wait for the keepcnt variable 220 value for the partition to be 0.

An index 120 can also contain a partition lookup structure 230. Partition lookup structure 230 can be a sorted array of partition identifiers along with a pointer to the partition. In an embodiment, only partitions in the ACTIVE state are included in partition lookup structure 230.

In an embodiment, various mechanisms are provided for controlling access to partitions depending to the partition's state. In an embodiment, partitions in ACTIVE state can be accessed by using a compare-and-swap instruction to increment keepcnt variable 220.

A process incrementing the variable (e.g., keepcnt 220) can use a compare-and-swap instruction, such as, for example, a CMPXCHG instruction provided in x86 processor architectures. A compare-and-swap instruction can serve to ensure that the process correctly updates the value of the keepcnt variable in a multi-threaded database environment. For example, suppose two processes want to access a partition 130. Both processes may read the current keepcnt value for the partition to be 2. If the processes were to update the value of keepcnt without using a compare-and-swap operation, the first process would set the keepcnt value to 3, but the second process would also set it to 3 if it read the value before the first process updated it. Instead, a compare-and-swap instruction can be used. A compare-and-swap instruction attempts to change the value of a variable as an atomic instruction. In the above example, the compare-and-swap instruction would compare the keepcnt value previously read by the second process and compare it with the current keepcnt value for the partition. If the values are different, the process will return the new keepcnt value and the second process can try to change it again. If the values are the same, the process changes the keepcnt value.

If a partition is in a non-active state, such as a DROP state, a process accessing it may obtain exclusive access to the process by using mutex 210.

Figure 3:
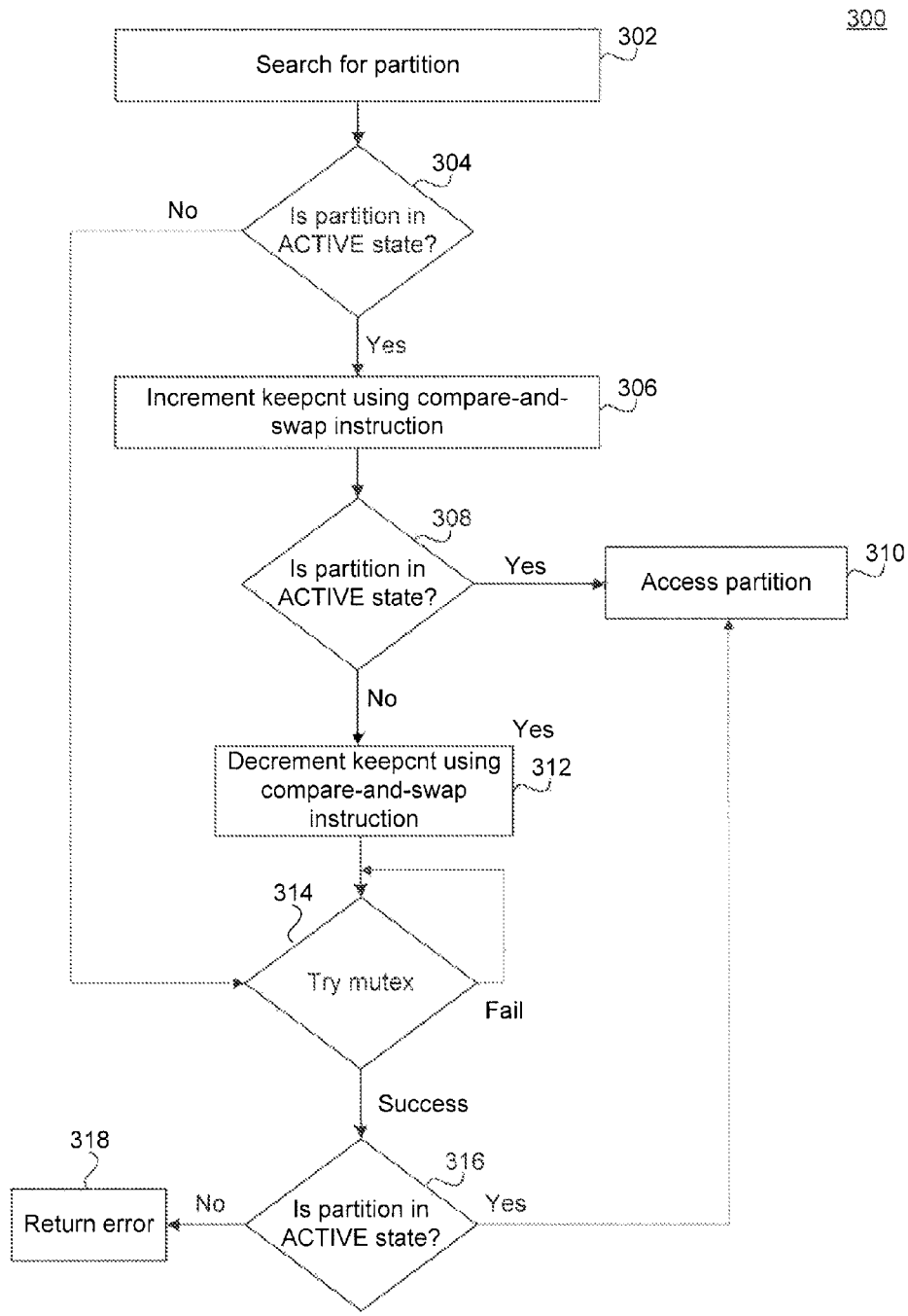
FIG. 3 is a flowchart for a method for accessing a partition while achieving multilevel synchronization of partition states, according to an example embodiment.

FIG. 3 is a flowchart for a method 300 for accessing a partition while achieving multilevel synchronization of partition states, according to an example embodiment. Method 300 can be performed by processing logic that can comprise hardware (e.g., circuitry, dedicated logic, programmable logic, microcode, etc.), software (e.g., instructions run on a processing device), or a combination thereof.

At step 302, a process looking to access a partition accesses the partition lookup structure and searches for the partition identifier (ID). In an embodiment, the process searches for the partition ID using a binary search algorithm, as will be understood by those skilled in the relevant arts.

At step 304, the process obtains the partition and determines whether the partition is still valid, i.e., is in the ACTIVE state. This step ensures that another process has not changed the state of the partition in a multi-threaded processing environment. If at step 304 the partition is not in the ACTIVE state, the process moves to a fallback procedure for changing the state of the partition by trying to access the mutex, as shown in step 314. If the partition is in the ACTIVE state, the process moves forward to step 306 to update the variable (e.g., keepcnt variable 220) that keeps track of the processes accessing the corresponding partition.

At step 306, the process increments the keepcnt variable 220 associated with the partition using a compare-and-swap atomic instruction. Again, this ensures effective synchronization of the partition state.

At step 308, the process again verifies that the partition is in the ACTIVE state. If the state is in the ACTIVE partition, the process can proceed with the partition access, as shown in step 310. If the partition state has changed, the process would decrement the keepcnt variable 220, as shown in step 312, and move to the fallback procedure of accessing the mutex, as shown in step 314.

At step 314, the process attempts to obtain the mutex. When the process succeeds at obtaining the mutex, the processor verifies that the partition is in the ACTIVE state, as shown at step 316. If the partition is in the ACTIVE state, the process accesses the partition, as shown in step 310. Otherwise, the process returns an error indicating that the partition is not ready for use.

Figure 4:
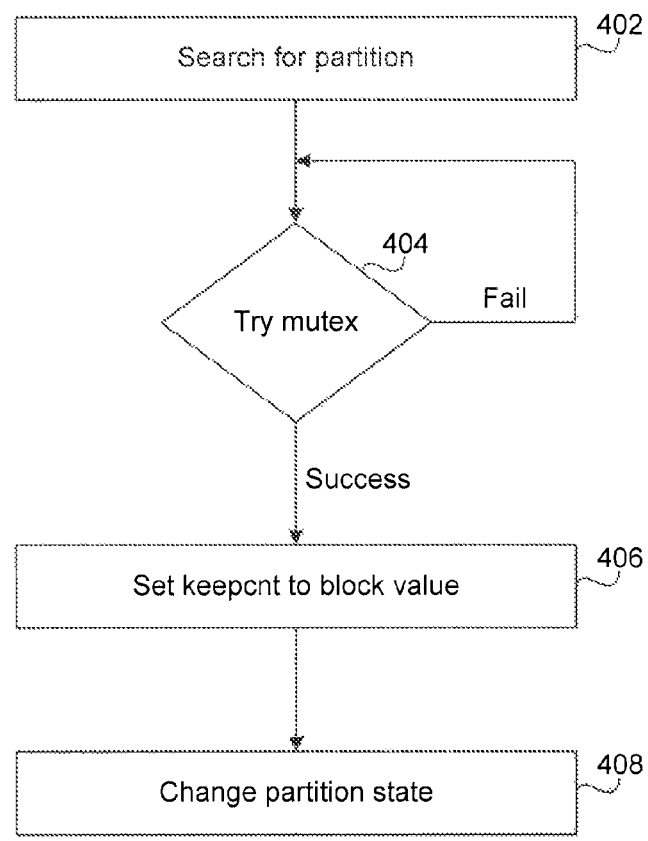
FIG. 4 is a flowchart describing a method of changing the state of a partition while achieving multilevel synchronization of partition states, according to an example embodiment.

FIG. 4 is a flowchart describing a method 400 of changing the state of a partition while achieving multilevel synchronization of partition states, according to an example embodiment. Method 400 can be performed by processing logic that can comprise hardware (e.g., circuitry, dedicated logic, programmable logic, microcode, etc.), software (e.g., instructions run on a processing device), or a combination thereof.

At step 402, a process looking to change the state of a partition accesses the partition lookup structure and searches for the partition identifier (ID). In an embodiment, the process searches for the partition id using a binary search algorithm, as will be understood by those skilled in the relevant arts.

At step 404, the process attempts to obtain mutex 210 for the partition.

Once the process can set mutex 210, the process sets the variable (e.g., keepcnt 220) for the partition to a blocked value, as shown in step 406. A blocked value can be any value that specifies that the partition is currently blocked from access. For example, the process can set the keepcnt 220 to a value of −100. Any other process trying to access the partition would read the blocked value and would wait to obtain mutex 210 that the process is holding.

At step 408, the process can then proceed to change the state of the partition.

Figure 5:
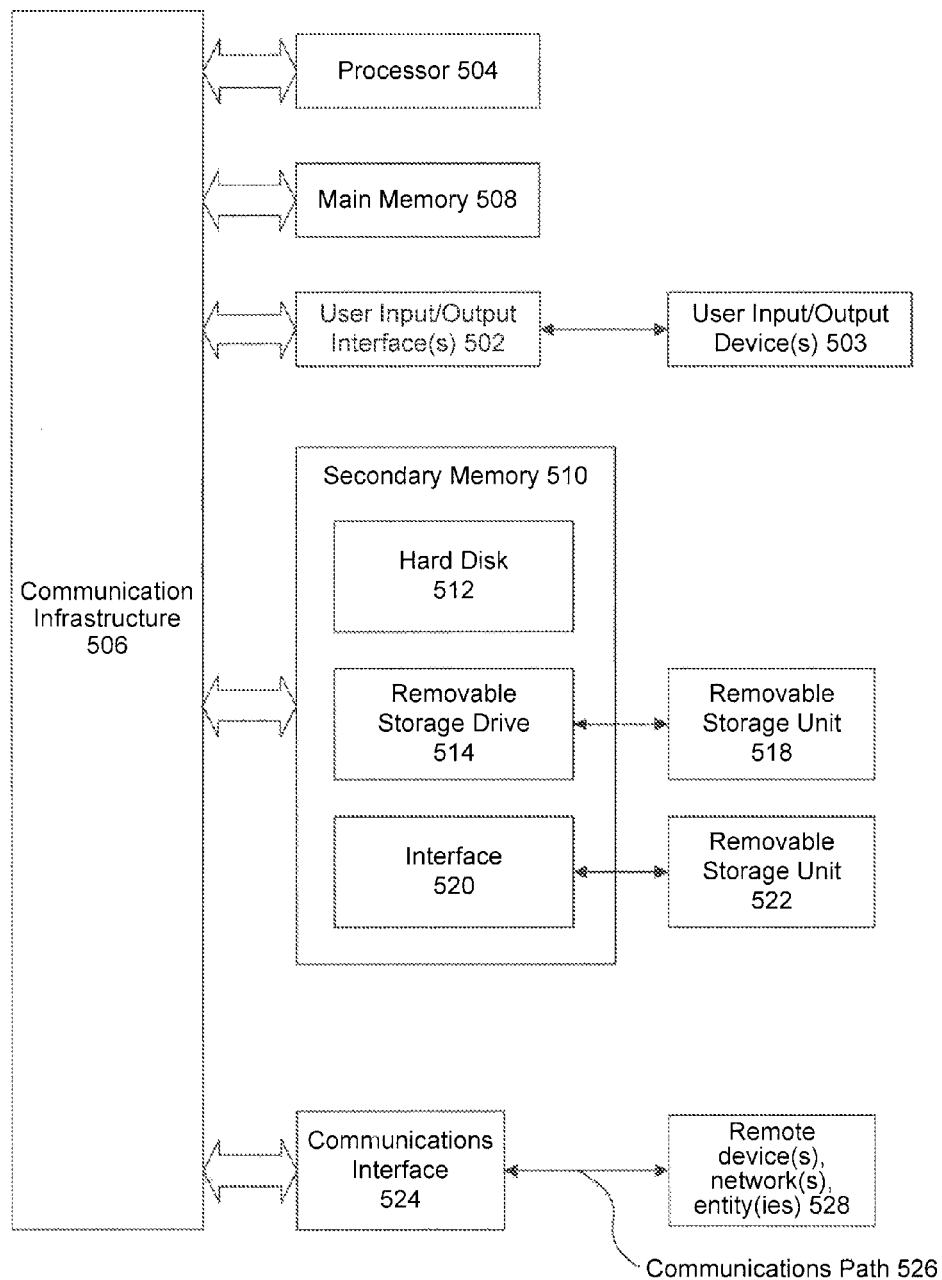
FIG. 5 is an example computer system useful for implementing various embodiments.

Various embodiments can be implemented, for example, using one or more well-known computer systems, such as computer system 500 shown in FIG. 5. Computer system 500 can be any well-known computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 5. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method for synchronizing partition states, comprising:
   retrieving; by at least one processor, a partition from a partition lookup structure;
   determining, by the at least one processor, whether the partition is in the active state indicating that the partition is available for use or a drop state indicating that the partition is not available; and
   based on a determination that the partition is in the active state:
      incrementing; by the at least one processor, a counter associated with the partition using a compare-and-swap instruction, wherein the counter is maintained separately from the state;
      verifying, from the partition lookup structure, whether the partition is accessible in the active state; and
      accessing, by the at least one processor, the partition based on the verification that the partition is in the active state.

2. The method of claim 1, further comprising:
   based on a determination that the partition is not in the active state:
   obtaining access to a mutex associated with the partition;
   setting the counter to a blocked value; and
   setting the partition to the active state.

3. The method of claim wherein the verifying comprises:
   determining, after the incrementing the counter, that the partition is either not accessible or not in the active state based on the verifying; and
   based on the determining that the partition is not in the active state, decrementing the counter using the compare-and-swap instruction.

4. The method of claim 3, further comprising:
obtaining access to a mutex associated with the partition;
setting the counter to a blocked value; and
setting the partition to the active state.

5. The method of claim 1, wherein the counter maintains a count of a number of processes accessing the partition.

6. The method of claim 2, wherein the mutex controls access to a plurality of partitions.

7. A system, comprising:
a memory; and
at least one processor coupled to the memory and configured to:
retrieve a partition from a partition lookup structure;
determine whether the partition is in the active state indicating that the partition is available for use or a drop state indicating that the partition is not available:
increment a counter associated with the partition using a compare-and-swap instruction wherein the counter is maintained separately from the state;
verify, from the partition lookup structure, whether the partition is accessible in the active state; and
access the partition based on the verification that the partition is in the active state.

8. The system of claim 7, the at least one processor further configured to:
based on a determination that the partition is not in the active state:
obtain access to a mutex associated with the partition;
set the counter to a blocked value; and
set the partition to the active state.

9. The system of claim 7, the at least one processor configured to verify is configured to:
determine, after the incrementing the counter, that the partition is either not accessible or not in the active state based on the verifying; and
based on the determining that the partition is not in the active state, decrementing the counter using the compare-and-swap instruction.

10. The system of claim 9, the at least one processor further configured to:
obtaining access to a mutex associated with the partition;
setting the counter to a blocked value; and
setting the partition to the active state.

11. The system of claim 7, wherein the counter maintains a count of a number of processes accessing the partition.

12. The system of claim 8, wherein the mutex controls access to a plurality of partitions.

13. A tangible computer-readable device having instructions stored thereon that, when executed by at least one computing device, causes the at least one computing device to perform operations comprising:
retrieving a partition from a partition lookup structure;
determining whether the partition is in the active state indicating that the partition is available for use or a drop state indicating that the partition is not available; and
based on a determination that the partition is in the active state:
incrementing a counter associated with the partition using a compare-and-swap instruction, wherein the counter is maintained separately from the state;
verifying, from the partition lookup structure, whether the partition is accessible in the active state; and
accessing the partition based on the verification that the partition is in the active state.

14. The computer-readable device of claim 13, further comprising:
based on a determination that the partition is not in the active state:
obtaining access to a mutex associated with the partition;
setting the counter to a blocked value; and
setting the partition to the active state.

15. The computer-readable device of claim 13, wherein the verifying comprises:
determining after the incrementing the counter, that the partition is either not accessible or not in the active state based on the verifying; and
based on the determining that the partition is not in the active state, decrementing the counter using the compare-and-swap instruction.

16. The computer-readable device of claim 15, further comprising:
obtaining access to a mutex associated with the partition;
setting the counter to a blocked value; and
setting the partition to the active state.

17. The computer-readable device of claim 13, wherein the counter maintains a count of a number of processes accessing the partition.

18. The computer-readable device of claim 14, wherein the mutex controls access to a plurality of partitions.

19. The method of claim 2, wherein the blocked value indicates that partition state is being changed and the partition is unavailable.

20. The method of claim 1, wherein the counter is maintained by partition with which it is associated.

* * * * *